United States Patent [19]

Lapsker

[11] 4,386,469
[45] Jun. 7, 1983

[54] RAILROAD CAR WHEEL GAUGE

[75] Inventor: Irving Lapsker, Monroe, N.Y.

[73] Assignee: Abex Corporation, New York, N.Y.

[21] Appl. No.: 270,943

[22] Filed: Jun. 5, 1981

[51] Int. Cl.³ .............................................. G01B 5/02
[52] U.S. Cl. .............................. 33/203.19; 33/143 D; 33/147 R; 33/174 Q
[58] Field of Search ............. 33/147 R, 147 J, 174 Q, 33/27 C, 203.19, 172 R, 143 R, 143 M, 143 D, 180 AT, 181 AT, 203.11

[56] References Cited

U.S. PATENT DOCUMENTS

| | | | |
|---|---|---|---|
| 293,768 | 2/1884 | Munton | 33/203.19 X |
| 1,240,528 | 9/1917 | Alsworth | 33/203.19 |
| 2,325,362 | 7/1943 | Black | 33/203.19 |
| 2,354,539 | 7/1944 | Passick et al. | 33/27 C X |
| 2,623,296 | 12/1952 | Bagge et al. | 33/172 R X |
| 3,052,033 | 9/1962 | Studt | 33/27 C X |
| 3,315,366 | 4/1967 | Marshall | 33/174 Q X |

*Primary Examiner*—William D. Martin, Jr.
*Attorney, Agent, or Firm*—Thomas S. Baker, Jr.; David A. Greenlee

[57] ABSTRACT

A device for measuring and reading out the variation in the distance between the axle bore and the tread of a railroad car wheel at different angular positions on the wheel.

2 Claims, 3 Drawing Figures

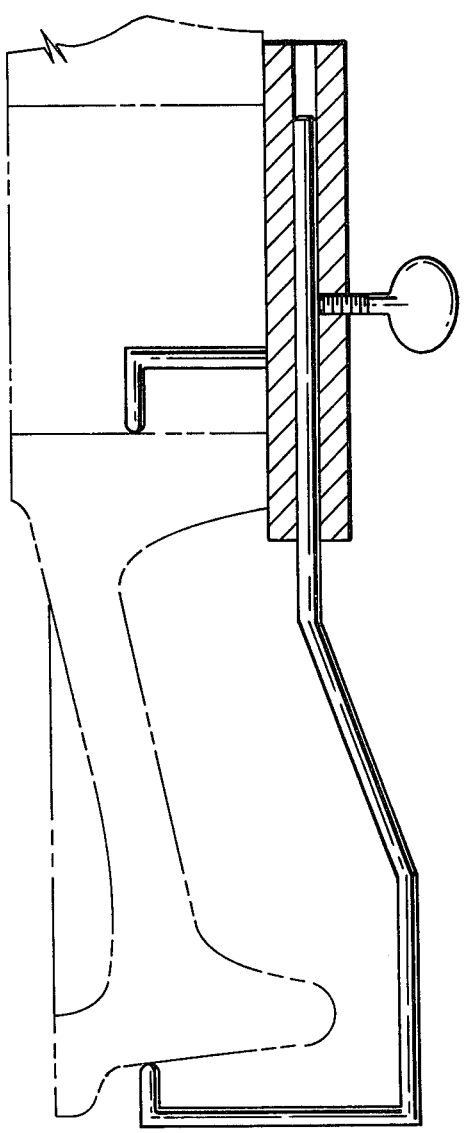

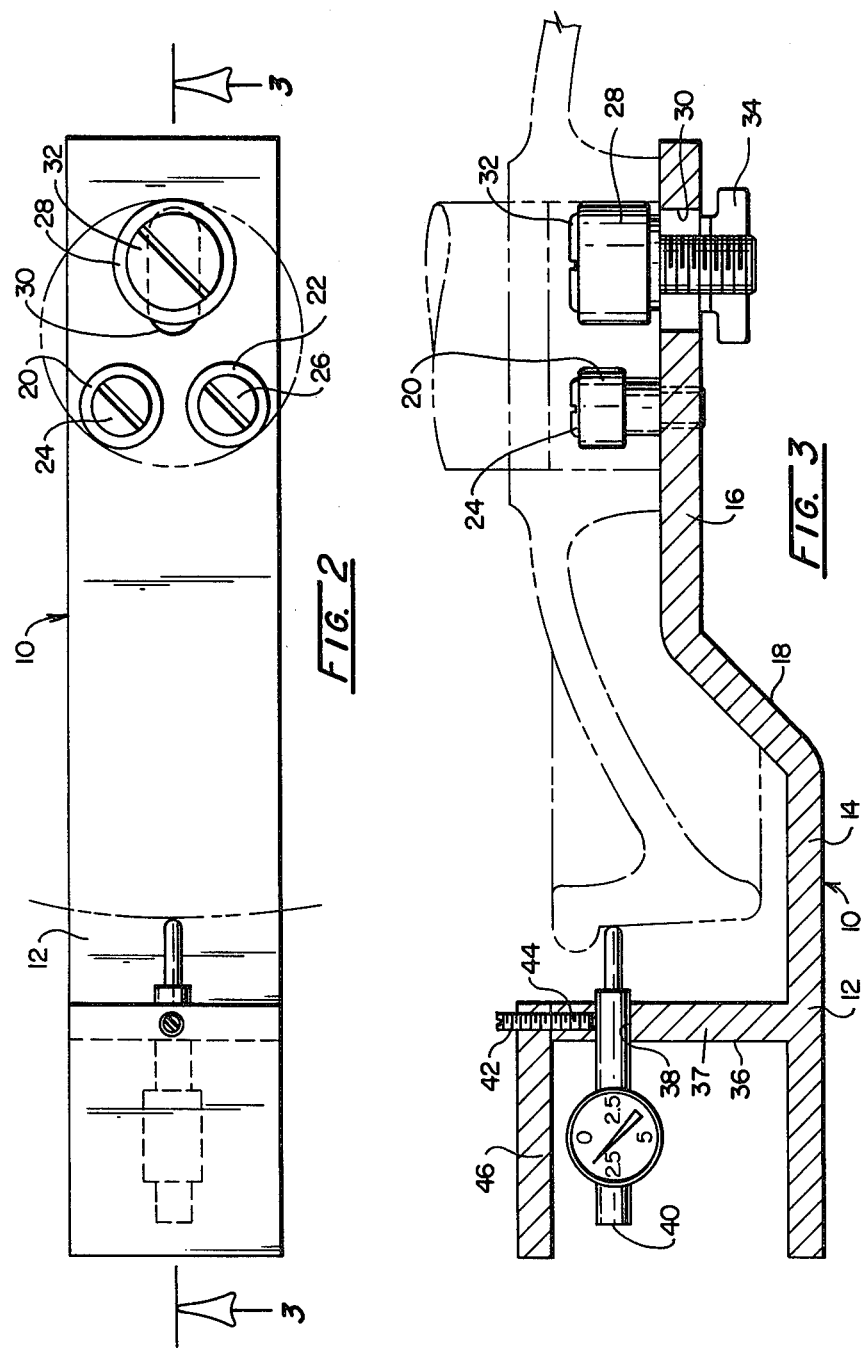

RAILROAD CAR WHEEL GAUGE

BACKGROUND OF THE INVENTION

This invention relates to a gauge for measuring the variation in the distance between the axle bore and the tread of a railroad car wheel at different angular positions on the wheel.

The Association of American Railroads has set a limit or tolerance on the variation in the distance measured along radial lines between the axle bore and the tread of a railroad car wheel. For some car wheels this tolerance is 0.0625 inches.

FIG. 1 shows a device presently used by railroad car wheel manufacturers to measure the variation in distance between the axle bore and tread of a car wheel. The presently used measuring device includes a U-shaped member having one short leg and one relatively long leg and an adjustable slide mounted on the long leg. A J-shaped member is rigidly attached to the adjustable slide and projects laterally therefrom. To position the measuring device on a railroad car wheel, the short leg of the U-shaped member is brought into engagement with the wheel tread and the adjustable slide is moved along the long leg of the U-shaped member until the tip of the J-shaped member just touches the axle bore. When the measuring device is so-positioned a thumbscrew is turned to lock the slide into position on the U-shaped member. In order to determine if the distance between the axle bore and the tread is within specification, the measuring device is rotated around the wheel. If an inspector cannot move the device around the wheel because the distance between the tread and the axle bore is too great, the thumbscrew is loosened and the slide is moved until the short end of the U-shaped member engages the tread and the tip of the J-shaped member just touches the axle bore at the greatest distance between the tread and the axle bore. As the measuring device is rotated, the inspector looks at the space between the short leg of the U-shaped member and the wheel tread to determine if this distance exceeds the tolerance set forth by the A.A.R. In other words, the inspector has to judge whether or not the space he sees is within or outside of the tolerance set by the A.A.R.

A problem with the present method of inspecting the tolerance between the tread and the axle bore is that the inspector has to decide whether the space between the short end of the U-shaped member and the tread is within the set tolerance. This becomes difficult in a close case.

An additional problem with the prior art measuring device is that it gives no indication of how far out of tolerance the wheel is.

It is desirable to provide a device for measuring the variation in distance between the axle bore and tread of a railroad car wheel which gives an inspector a direct read out of the variation in this dimension to thereby eliminate the need for an inspector to make a decision based on his judgement of what he sees.

It is further desirable to provide a device for measuring the variation in the distance between the axle bore and tread of a railroad car wheel which can be utilized on different sizes of railroad car wheels.

SUMMARY OF THE INVENTION

The instant invention provides a device for measuring the variation in the distance between the axle bore and tread of a railroad car wheel and provides a direct indication of the variation in this distance along different radii of the wheel.

DESCRIPTION OF THE DRAWINGS

FIG. 1 discloses a prior art device used for measuring the variation in the distance between the axle bore and tread of a railroad car wheel;

FIG. 2 shows the top view of the measuring device of the instant invention; and

FIG. 3 is a sectional view along line 3—3 of FIG. 2.

DESCRIPTION OF THE PREFERRED EMBODIMENT

Referring to FIGS. 2 and 3, the railroad car wheel gauge 10 of the instant invention includes a frame 12 which is preferably constructed from a piece of stainless steel which may be three-quarters of an inch thick and approximately four inches wide. In FIG. 3, it can be seen that frame 12 includes a pair of offset legs 14, 16 which are connected by an angled member 18. Leg 14 must be offset from leg 16 so that it will clear the tread of a railroad car wheel during the inspection operation, as described hereinafter.

A pair of cam followers 20, 22 are rigidly mounted on frame leg 16 by bolts 24, 26, respectively, at the approximate midpoint of the leg 16. The cam followers 20, 22 are offset from the longitudinal centerline of frame 12 and leg 16 by an equal amount.

A third cam follower 28 is slidably mounted in a longitudinal slot 30 along the centerline and adjacent the outer end of leg 16. Cam follower 28 is rotatably mounted on a bolt 32 which passes through slot 30 and has a nut 34 threaded on the end thereof. When the nut 34 is tightened cam follower 28 is locked into a position along slot 30.

An L-shaped indicator support member 36 projects laterally upward from the approximate midpoint of leg 14 on frame 12. A bore 38 which is aligned with the longitudinal centerline of frame 12 is formed in the vertical leg 37 of support member 36. One end of a dial indicator gauge 40 is received in bore 38. The dial indicator gauge 40 is locked in position in bore 38 by a set screw 42 in a threaded bore 44 which opens into indicator bore 38. Dial indicator gauge 40 when mounted in bore 38 is positioned between the horizontal leg 46 of indicator support member 36 and the end of leg 14 on frame 12. Consequently, the dial indicator gauge 40 which is relatively fragile is well protected.

Use of the gauge 10 to measure the tolerance between the axle bore and tread of a railroad car wheel is as follows. A railroad car wheel is rotatably mounted on a horizontal shaft shown in phantom in FIG. 3 which engages one end of the axle bore of the wheel. The cam followers 20, 22 are inserted into the opposite end of the axle bore and nut 34 is loosened so that cam follower 28 is moved in slot 30 until the three cam followers 20, 22 and 28 all engage the wall defining the axle bore. The nut 34 is tightened to secure the position of cam follower 28 in slot 30. Subsequently, dial indicator gauge 40 is inserted in bore 38 so that its movable end engages the wheel tread and set screw 42 is tightened when gauge 40 is properly positioned. The dial indicator gauge 40 is zeroed, i.e., the face of the gauge is rotated until the indicator needle points to zero. The railroad car wheel is rotated on the shaft. As the wheel rotates the variation in distance between the axle bore and the tread of the wheel is shown directly by the dial indicator needle. If the variation in this dimension is within the set tolerance, the wheel is acceptable. If the dimension is not within the set tolerance, the wheel will be remachined or scrapped.

Although a preferred embodiment of the invention has been illustrated and described, it will be apparent to those skilled in the art that various modifications may be made without departing from the spirit and scope of the present invention.

What is claimed is:

1. A device for measuring the variation in the distance between the axle bore and tread of a railroad car wheel as the wheel is rotated; characterized by a frame having a first leg, a second leg and a central member which connects the first and second legs such that the plane of the first leg is offset from the plane of the second leg and the plane of the second leg is below the plane of the first leg when the measuring device is mounted on a car wheel such that the car wheel tread does not hit the second leg; a pair of rollers rigidly mounted on the first leg; a third roller adjustably mounted on the first leg; wherein the three rollers project laterally above the first leg are in the same plane and engage the wall defining a car wheel axle bore to thereby mount the measuring device on the car wheel; an indicator support member affixed to the second leg radially outboard of a railroad car wheel tread; wherein the indicator support member projects laterally of the second leg and above the plane of the first leg; and an indicator mounted in the support member such that when the device is mounted on a car wheel the indicator engages the tread of the car wheel to provide a direct readout of the variation in distance between the wall defining the axle bore and the wheel tread as the wheel is rotated and the indicator lies in substantially the same place as that of the three rollers.

2. The device of claim 1, wherein the indicator support member includes a horizontal leg and a vertical leg, the indicator is received in a bore in the vertical leg and the horizontal leg overlies the top of the indicator and the outer end of the second leg projects beyond the bottom of the indicator such that the indicator is sandwiched between and protected by the horizontal leg and the outer end of the second leg.

* * * * *